(12) United States Patent
Wick

(10) Patent No.: US 9,730,374 B2
(45) Date of Patent: Aug. 15, 2017

(54) DUAL-POSITION QUICK-CONNECT MOUNT AND ADJUSTABLY TENSIONED STALK STOMPER

(71) Applicant: May-Wes Mfg., Hutchinson, MN (US)

(72) Inventor: Benjamin Wick, Hutchinson, MN (US)

(73) Assignee: May-Wes Mfg., Hutchinson, MN (US)

( * ) Notice: Subject to any disclaimer, the term of this patent is extended or adjusted under 35 U.S.C. 154(b) by 0 days.

(21) Appl. No.: 14/596,085

(22) Filed: Jan. 13, 2015

(65) Prior Publication Data

US 2015/0201544 A1  Jul. 23, 2015

Related U.S. Application Data

(60) Provisional application No. 61/928,919, filed on Jan. 17, 2014.

(51) Int. Cl.
| | |
|---|---|
| *A01D 34/835* | (2006.01) |
| *A01B 63/00* | (2006.01) |
| *A01B 39/22* | (2006.01) |
| *A01B 63/24* | (2006.01) |
| *A01D 45/02* | (2006.01) |

(52) U.S. Cl.
CPC ............ *A01B 63/002* (2013.01); *A01B 39/22* (2013.01); *A01B 63/24* (2013.01); *A01D 34/8355* (2013.01); *A01D 45/021* (2013.01)

(58) Field of Classification Search
CPC ....... A01B 63/002; A01B 63/24; A01B 63/26; A01B 39/22; A01B 61/00–61/048; A01B 15/20; A01D 45/021; A01D 34/8355
USPC ............................................ 37/468; 172/272
See application file for complete search history.

(56) References Cited

U.S. PATENT DOCUMENTS

| 4,029,155 | A | * | 6/1977 | Blair | .................... | A01B 23/043 |
| | | | | | | 172/142 |
| 5,165,486 | A | * | 11/1992 | Davidson | ............... | A01B 49/02 |
| | | | | | | 172/499 |
| 5,692,855 | A | * | 12/1997 | Burton | ................. | E02F 3/3631 |
| | | | | | | 172/272 |
| 5,725,057 | A | * | 3/1998 | Taylor | ................... | A01B 29/04 |
| | | | | | | 172/121 |
| 6,138,770 | A | * | 10/2000 | Kayser | .................. | A01B 59/06 |
| | | | | | | 172/272 |

(Continued)

*Primary Examiner* — Alicia Torres
*Assistant Examiner* — Adam Behrens
(74) *Attorney, Agent, or Firm* — DuFault Law Firm, P.C.; Dustin R. DuFault

(57) ABSTRACT

Apparatus and associated methods relate to a two-position quick-connect mounting system for mounting a farm implement to a toolbar in an operating configuration, the mounting assembly including a toolbar bracket and an implement bar, the implement bar being mounted to the toolbar bracket by: i) raising the implement bar into a downward facing cavity of the toolbar bracket; and ii) longitudinally translating the implement bar such that lateral projections on either side of the implement bar are received into operating slots in the toolbar bracket, and a spring-biased locking member automatically engages a securing member. In an illustrative embodiment, the implement bar may be mounted to the toolbar bracket in a stowage configuration by sliding the projections into stowage slots separate from the operating slots. In some embodiments, the implement may advantageously be mounted in one of two mounting configurations, without requiring tools.

11 Claims, 22 Drawing Sheets

(56) References Cited

U.S. PATENT DOCUMENTS

| | | | | |
|---|---|---|---|---|
| 6,231,296 B1* | 5/2001 | Blomgren | ............ | E02F 3/3631 37/468 |
| 6,254,331 B1* | 7/2001 | Pisco | ................... | E02F 3/3618 37/468 |
| 6,629,811 B1* | 10/2003 | Husson | ................ | E02F 3/3613 37/468 |
| 6,709,224 B2* | 3/2004 | Heiple | ................ | E02F 3/3663 37/468 |
| 7,014,385 B2* | 3/2006 | Lim | ..................... | E02F 3/3618 172/272 |
| 7,198,451 B2* | 4/2007 | Wimmer | ............... | E02F 3/3627 37/468 |
| 8,469,623 B2* | 6/2013 | Luyendijk | ............... | E02F 3/364 37/468 |
| 8,806,846 B2* | 8/2014 | Hyronimus | ............ | A01D 63/00 56/314 |
| 2003/0094823 A1* | 5/2003 | Bradford | ................ | A01B 1/02 294/51 |
| 2006/0242865 A1* | 11/2006 | Herguido Fo | ........ | E02F 3/3613 37/468 |
| 2007/0169951 A1* | 7/2007 | Clement | ............. | A01B 59/062 172/439 |
| 2008/0296031 A1* | 12/2008 | Yeager | ................... | E02F 3/364 172/272 |
| 2013/0019581 A1* | 1/2013 | Hyronimus | ............ | A01D 63/00 56/314 |
| 2013/0020100 A1* | 1/2013 | Shoup | .................. | A01B 61/046 172/762 |
| 2013/0020101 A1* | 1/2013 | Shoup | ..................... | A01B 39/22 172/763 |
| 2013/0174529 A1* | 7/2013 | Hyronimus | ............ | A01D 75/00 56/314 |
| 2013/0177348 A1* | 7/2013 | Hyronimus | ............ | A01D 75/00 403/164 |
| 2014/0131973 A1* | 5/2014 | Benoit | .................. | A01D 34/8355 280/160 |
| 2014/0209335 A1* | 7/2014 | Casper | ..................... | A01B 5/04 172/260.5 |
| 2014/0361563 A1* | 12/2014 | Sickler, Jr. | ............... | G01V 3/15 294/51 |
| 2015/0096773 A1* | 4/2015 | Miller | ................ | A01D 34/8355 172/540 |

* cited by examiner

DUAL-POSITION QUICK-CONNECT MOUNT AND ADJUSTABLY TENSIONED STALK STOMPER

CROSS-REFERENCE TO RELATED APPLICATIONS

This application claims the benefit of U.S. Provisional Application Ser. No. 61/928,919, titled "Dual-Position Quick-Connect Mount and Adjustably Tensioned Stomper," filed by Ben Wick, on Jan. 17, 2014. The entirety of the foregoing application is hereby incorporated by reference.

TECHNICAL FIELD

Various embodiments relate generally to farm implement attachment assemblies for attaching farm implements to toolbars of mobile farm vehicles.

BACKGROUND

Farm implements have been used since ancient times. Since the days of motor-powered vehicles, farm implements have been attached to tractors, combines, trucks and other mobile vehicles. These implements till the ground, plant various seeds, apply weed treatments and pesticides, harvest crops, and many other tasks. Each different implement may have a specific form-factor. Each different implement may require a specific position or attitude with respect to that upon which it is designed to operate. For example, the tills require insertion into the ground, and fertilize applicators may be positioned above the crops. The tool specific position and attitude requirements may implicate different mounting requirements of the tool to the vehicle. In some cases, tools may be used in combination with other tools. These tools may have relational dependencies. For example, a corn harvester may require contact with a plant before the corn stalks are contacted by a stalk stomper, which in turn may be positioned before a vehicle's wheels encounter the stalks.

SUMMARY

Apparatus and associated methods relate to a two-position quick-connect mounting system for mounting a farm implement to a toolbar in an operating configuration, the mounting assembly including a toolbar bracket and an implement bar, the implement bar being mounted to the toolbar bracket by: i) raising the implement bar into a downward facing cavity of the toolbar bracket; and ii) longitudinally translating the implement bar such that lateral projections on either side of the implement bar are received into operating slots in the toolbar bracket, and a spring-biased locking member automatically engages a securing member. In an illustrative embodiment, the implement bar may be mounted to the toolbar bracket in a stowage configuration by sliding the projections into stowage slots separate from the operating slots. In some embodiments, the implement may advantageously be mounted in one of two mounting configurations, without requiring tools.

Various embodiments may achieve one or more advantages. For example, some embodiments may facilitate the mounting of a heavy farm implement by securing the implement automatically with a spring mounted securing member when the implement is positioned in its mounted position. Automatic securing means may free up the hands of a person mounting the implement so that both arms may be used to support the implement during mounting and dismounting. Heavy farm implements may be readily mounted using various embodiments. For example, a person may position the mount beneath the bracket, lift the implement till it is in contact with the bracket and then slide the implement into position. An audible sound may indicate to the person that the spring-loaded securing member has secured the implement into its mounted position. The mounting of farm implements may be expedited by the secure knowledge of the implement having been secured properly.

In some embodiments, dismounting an implement may be facilitated as a person may simply actuate the securing member against the spring force, slide the implement, and let the implement to the ground. In some embodiments, the securing pin, being affixed to the implement may provide a handle to support the implement during the dismount operation. The implement may be remounted to the bracket in a second mounting orientation. For example, in some embodiments, an implement may be easily moved from a secure operating position to a secure transport position. The implement may be removed from the first position as described above and then positioned in its transport orientation, lifted into the brackets transport slots and slid into the transport position, which results in the spring-loaded securing member to secure the implement.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

To aid understanding, this document is organized as follows. First, the two-position mounting bracket is briefly introduced with reference to FIGS. 1-2. Second, with reference to FIGS. 3-4, the discussion turns to exemplary embodiments of complementary mounting features on an implement bar. Then, with reference to FIGS. 5-7, an operationally mounted assembly of an exemplary stalk stomper to a toolbar bracket will be described. Then a transport mounted assembly will be described, with reference to FIGS. 8-10. Alternate embodiments of stalk-stomper mounts will then be described. Then, FIGS. 11-12 will facilitate description of an alternative dual-position implement mount. An exemplary dual-position mount designed for easy transition between operating mode and transport mode will then be described with reference to FIGS. 13-14. Then, with reference to FIGS. 15-16, an exemplary spring-tension secured implement mount assembly will be described. Discussion of an exemplary spring adjustment mechanism will follow, with reference to FIG. 17. Finally, with reference to FIGS. 18-22, various exemplary toolbar mounting brackets will be described.

When harvesting corn, many farm vehicles are equipped with stalk stompers which are tools for deflecting the stem of a corn stalk toward the ground. Such stem deflection is used to flatten the stalks before the wheels of the vehicle encounters the stem. Corn stalks may have strong stems that may damage the tires of farm vehicles. Thus the stalk stomper may be mounted fore of the vehicle to deflect the potentially damaging stalks before wheel encounter. The stalk stompers have positioned such that the deflecting member is in contact with the ground. In this way, the stems are deflected at the point at which they stalks emerge from the ground. A spring force may help maintain the ground contact of the stalk stomper as the vehicle moves over various topographical ground features.

Before the farm vehicle is driven on a paved road, the stalk stompers may be re-positioned so as not to be abraded by the pavement. Exemplary dual-position quick-connect mounting assemblies may facilitate the mounting of farm implements in general and stalk stompers in specific to farm vehicles.

Figure 1:
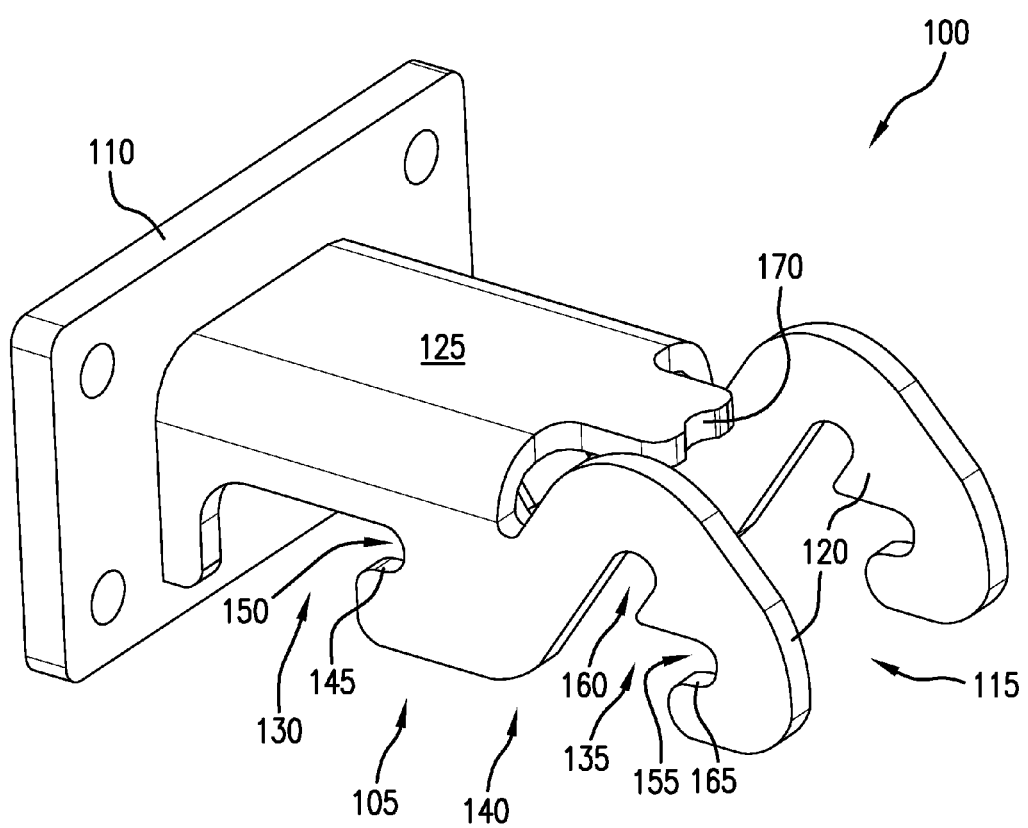
FIGS. 1-2 depict perspective views of an exemplary mounting bracket for a farm implement.
Figure 2:
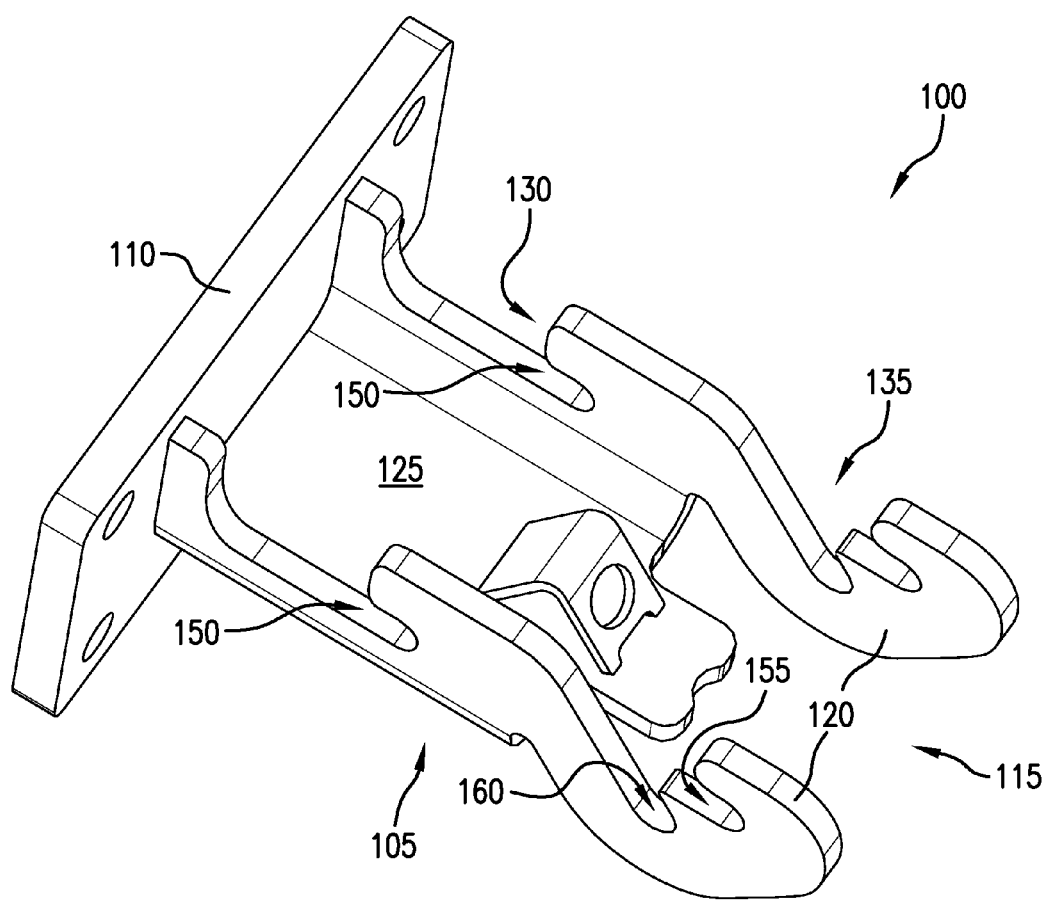

FIGS. 1-2 depict perspective views of an exemplary mounting bracket for a farm implement. In the FIGS. 1-2 embodiment, an exemplary toolbar bracket 100 includes a U-channel 105 having a variety of features. Various slots, channels and holes mark the U-channel 105. A toolbar mounting plate 110 connects to the U-channel 105. The U-channel is typically mounted to a toolbar connected to the vehicle in the orientation as depicted in FIG. 1. Thus the U-channel looks upside-down when viewed from a front end 115. The U-channel has two sidewalls 120 and a top plate 125. Each sidewall 120 has two recesses 130, 135, one toward the front end 115 and one toward the mounting plate 110. The recess 130 toward the mounting plate 110 has an opening facing a bottom 140 of the U-channel 105. The recess 130 also has a shelf 145 which may provide support for a projection inserted into a slot 150 directly above the shelf 145.

The front recess 135 has two slots 155, 160. An operating slot 155 has a shelf 165 for supporting a projection inserted into the operating slot 155. The transport recess 160 may receive a projection when an implement is oriented in a transport fashion. The U-channel has two securing features 170, 175 for engaging a securing member. An operating securing ledge 170 may engage the securing member when an implement is mounted in an operating orientation. A transport securing hole 175 may receive a securing pin when the implement is mounted in a transport orientation.

Figure 3:
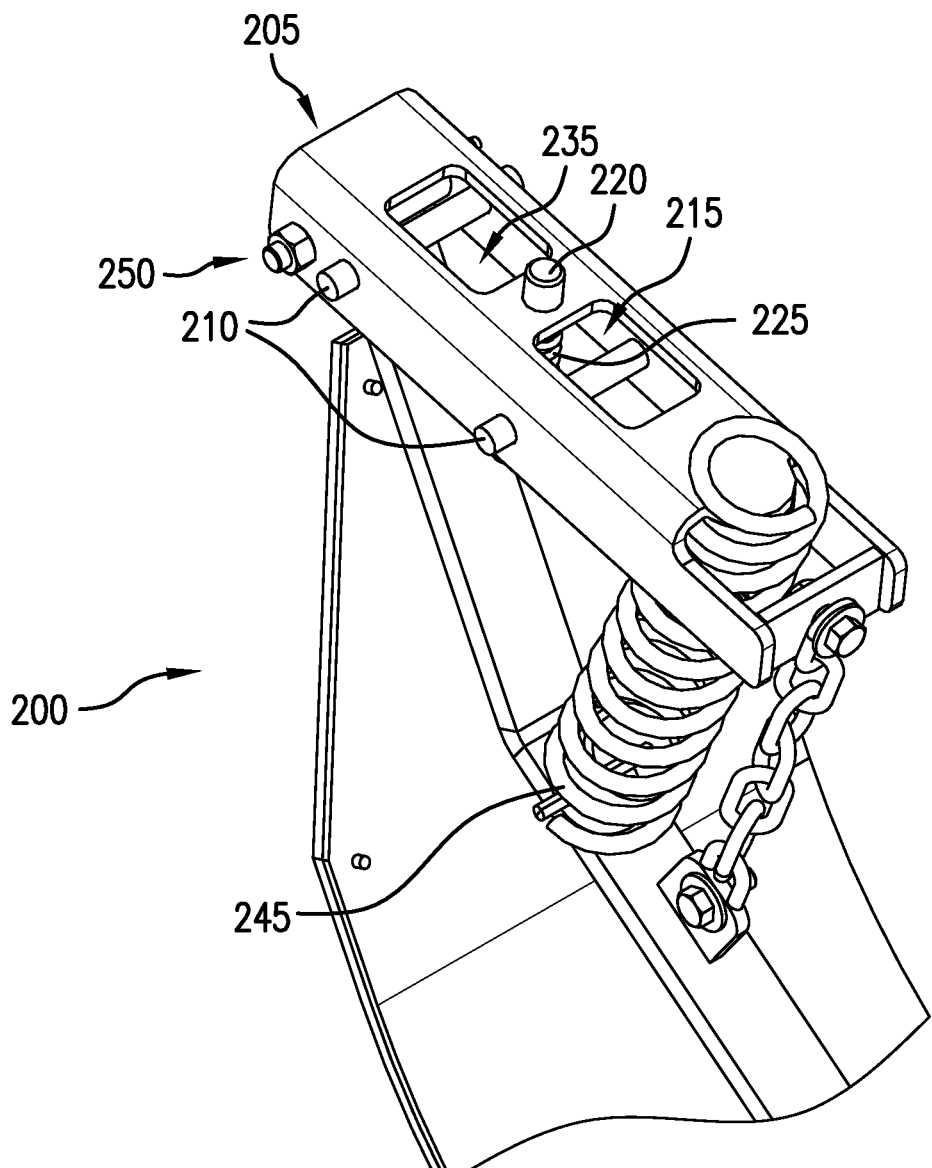
FIGS. 3-4 depict perspective views of an exemplary stalk stomper farm implement.
Figure 4:
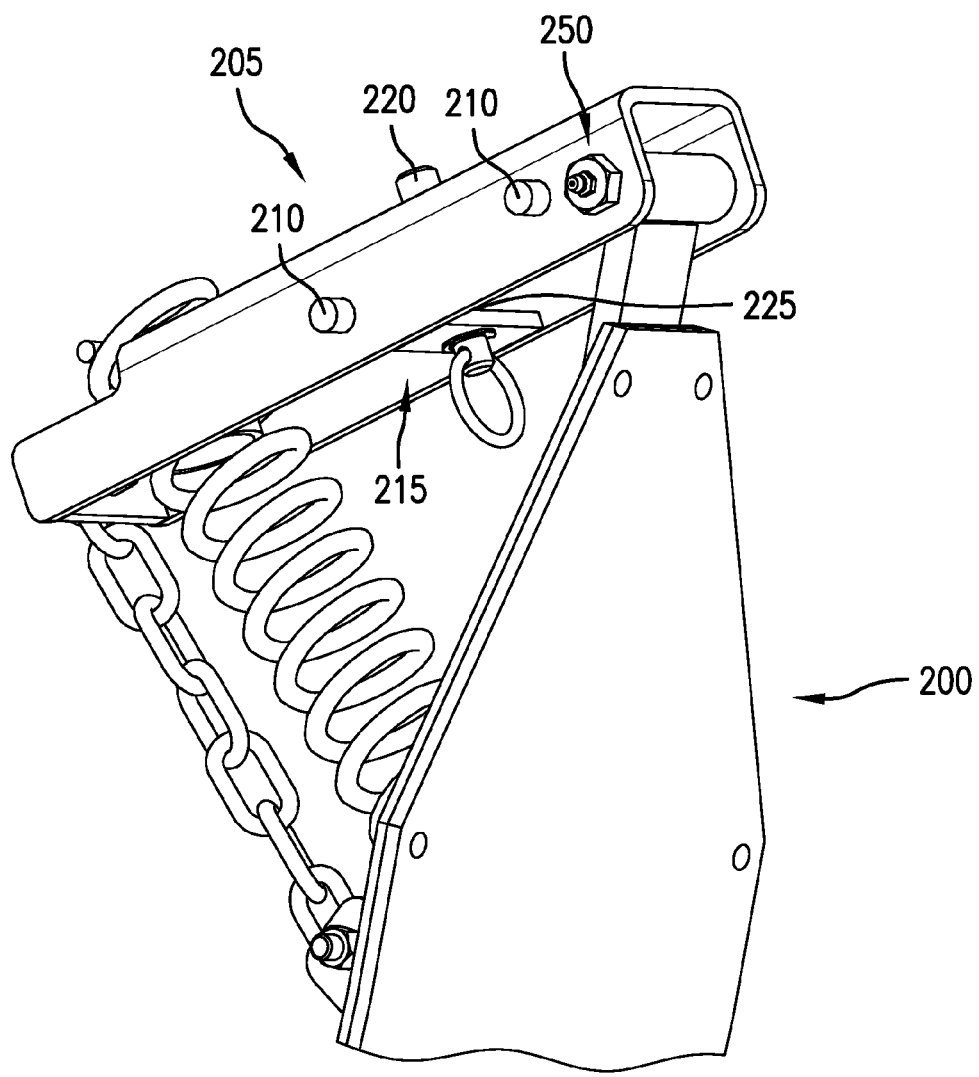

FIGS. 3-4 depict perspective views of an exemplary stalk stomper farm implement. In the FIGS. 3-4 embodiment, an exemplary stalk stomper 200 includes an implement bar 205. The exemplary implement bar 205 is depicted as having features that are complementary to many of those of the exemplary toolbar bracket 100. The depicted implement bar 205 has a pair of horizontal projections 210 on both sides to the implement bar 205. The horizontal projections 210 are spaced apart a distance substantially equal to the distance between the shelves 145, 165 of the exemplary mounting bracket 100. A spring-loaded securing member 215 includes a pin 220 being biased by a spring 225. When the exemplary implement bar 205 is position with the horizontal projections 210 directly beneath the recesses 130, 135 of the toolbar bracket 100, the implement bar may be raised into the U-channel 105. When the implement bar 205 is received by the U-channel 105, the horizontal projections 210 may be received into the recesses 130, 135. The implement bar 205 may then be longitudinally slid so that the operating slots 150, 155 may receive the horizontal projections 210. When the projections 210 are received by the operating slots 150, 155, the projections may be supported by the shelves 145, 165 of the sidewalls 120 of the U-channel 105. And when the implement bar 205 is longitudinally slid so that the operating slots 150, 155 receive the horizontal projections 210, the securing pin 220 may automatically engage securing ledge 170 by the biasing of spring 225.

Figure 5:
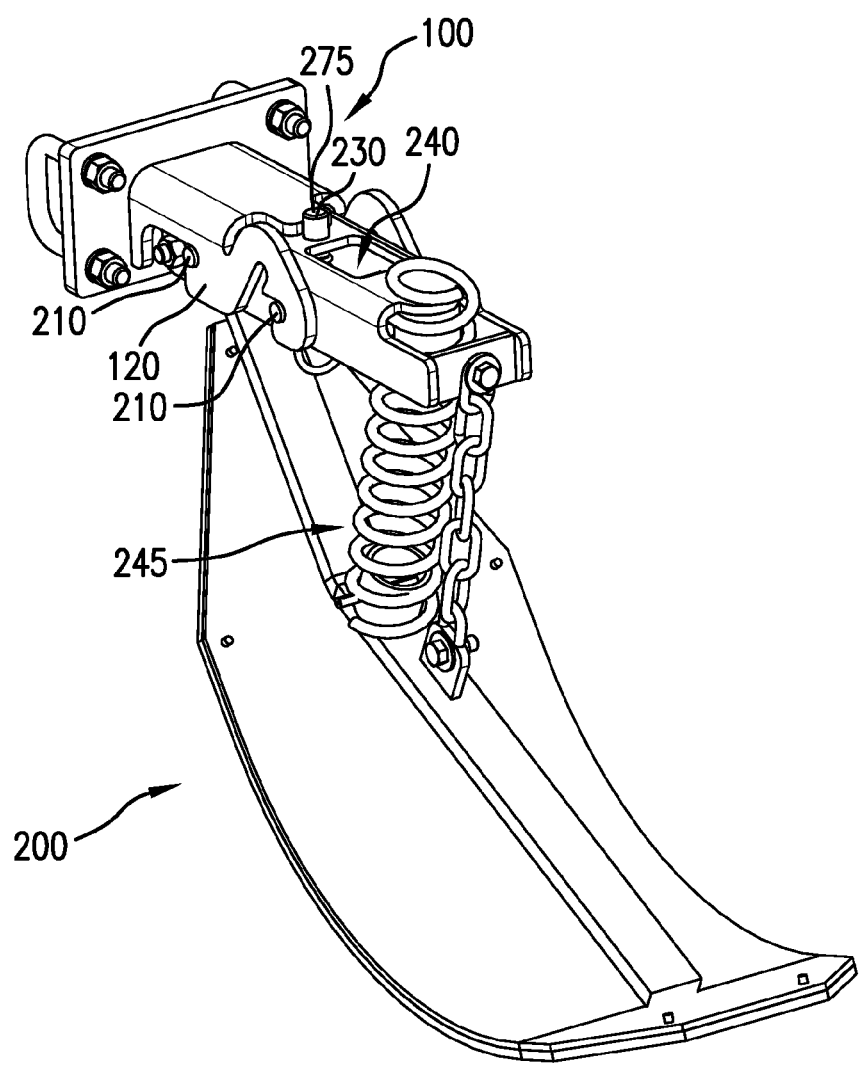
FIGS. 5-7 depict perspective views of an exemplary stalk stomper mounted in an operating position on a toolbar.
Figure 6:
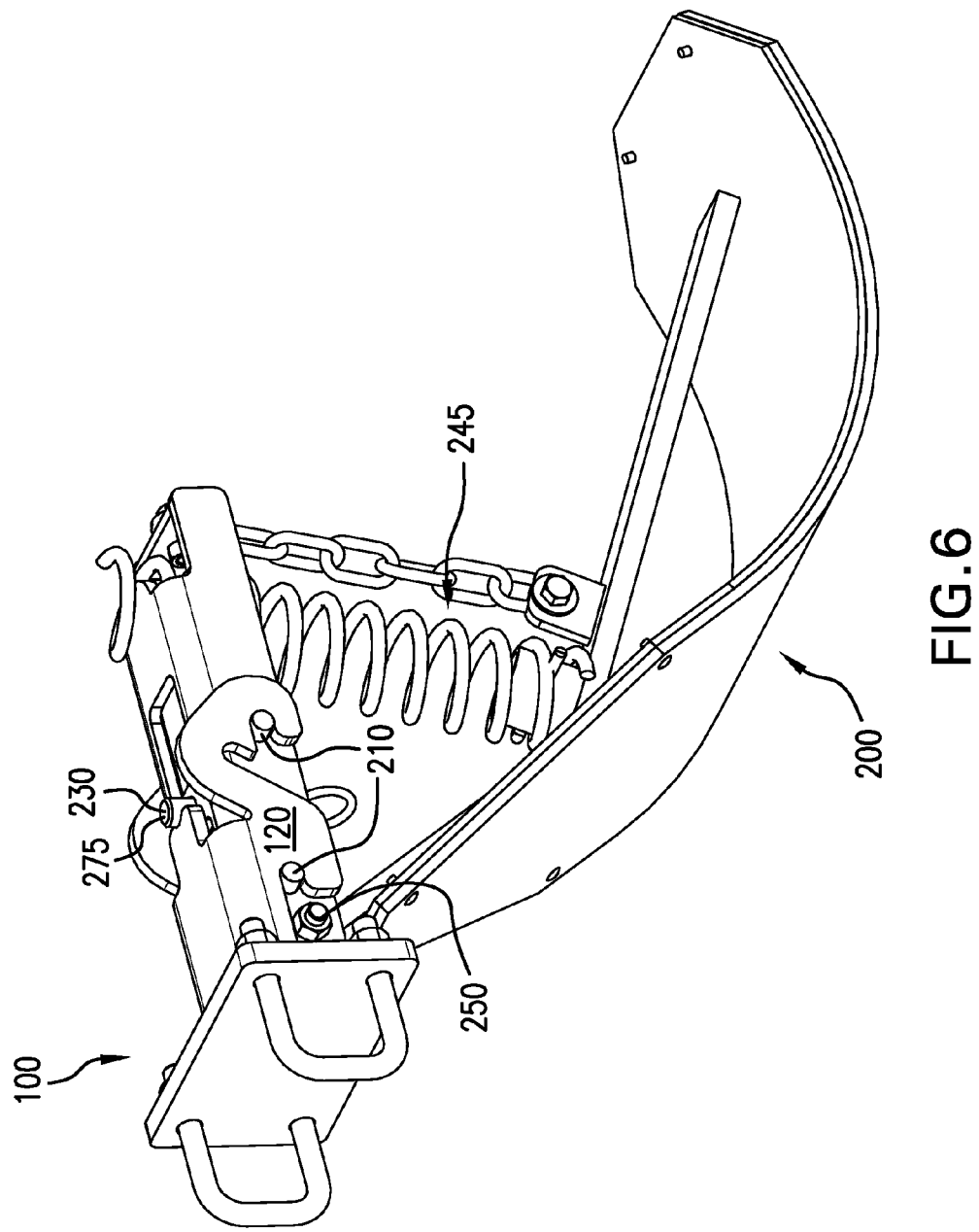
Figure 7:
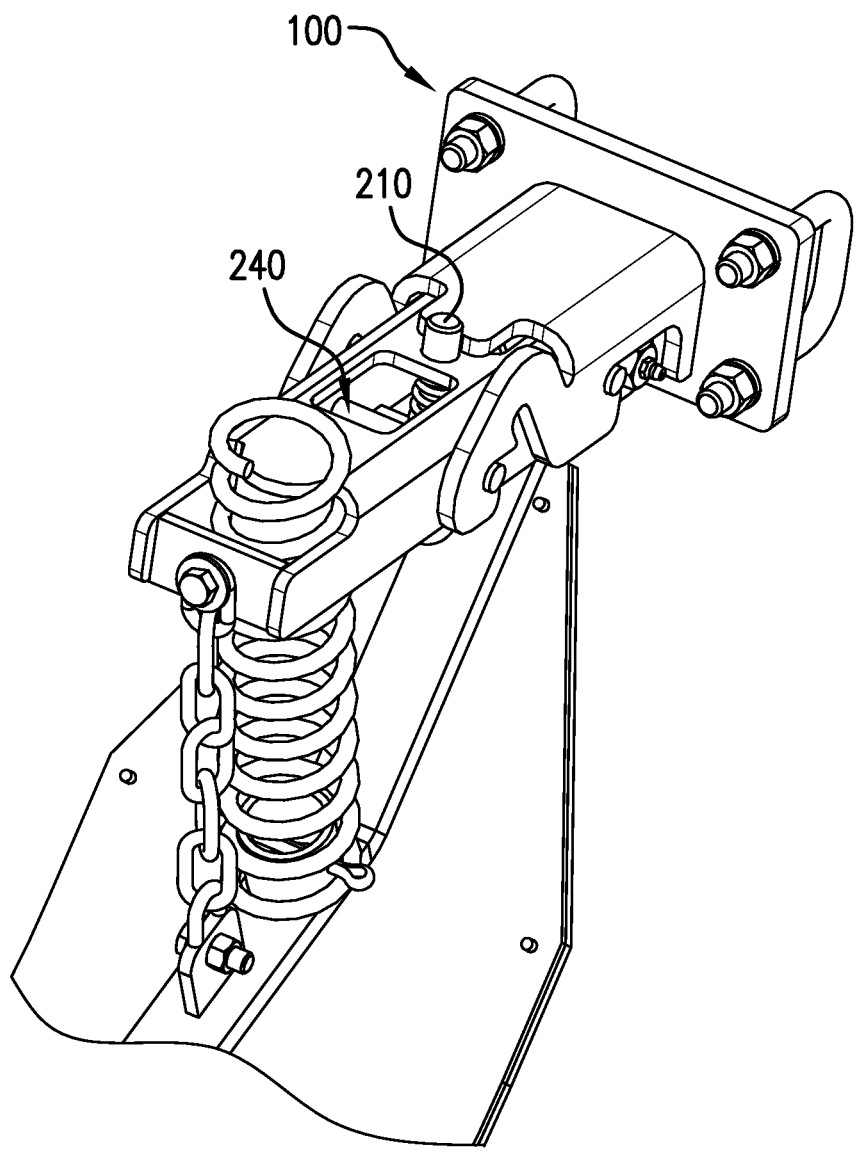

FIGS. 5-7 depict perspective views of an exemplary stalk stomper mounted in an operating position on a toolbar. In the FIGS. 5-7 depiction, the exemplary stalk stomper 200 is shown having been securely mounted to the exemplary toolbar mount 100. The horizontal projections 210 are seen supported by the operating shelves 145, 165 in the sidewalls 120 of the U-channel 105. An end 230 of the securing pin 220 is shown engaging the securing ledge 170.

A few complementary features of the toolbar bracket and the implement bar have yet to be described. Returning to FIG. 2, the transport securing hole 175 is in a diagonally mounted L-bracket 180. The L-bracket 180 projects down from the inside surface of the U-channel 105. An operating cutout 235 in the implement bar 200 permits U-channel 105 to receive the implement bar 200 without interference from the L-bracket 180. The operating cutout 235 may receive the L-bracket 180 when the implement bar 200 is received into the U-channel 105. The implement bar 200 has a similar transport cutout 240 for receiving an operating hole projection 185 of the U-channel.

Figure 8:
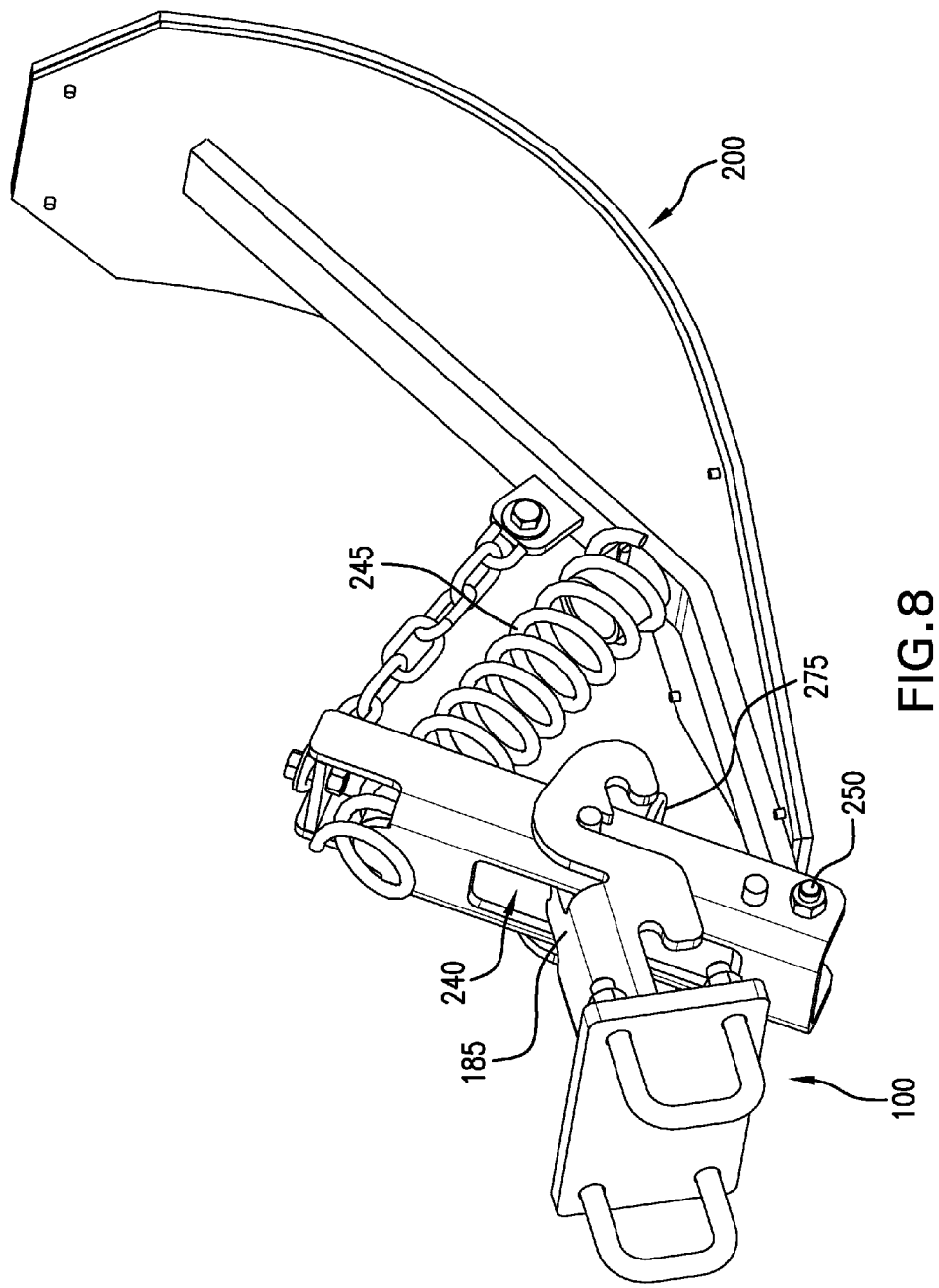
FIGS. 8-10 depict perspective views of an exemplary stalk stomper mounted in a transport position on a toolbar.
Figure 9:
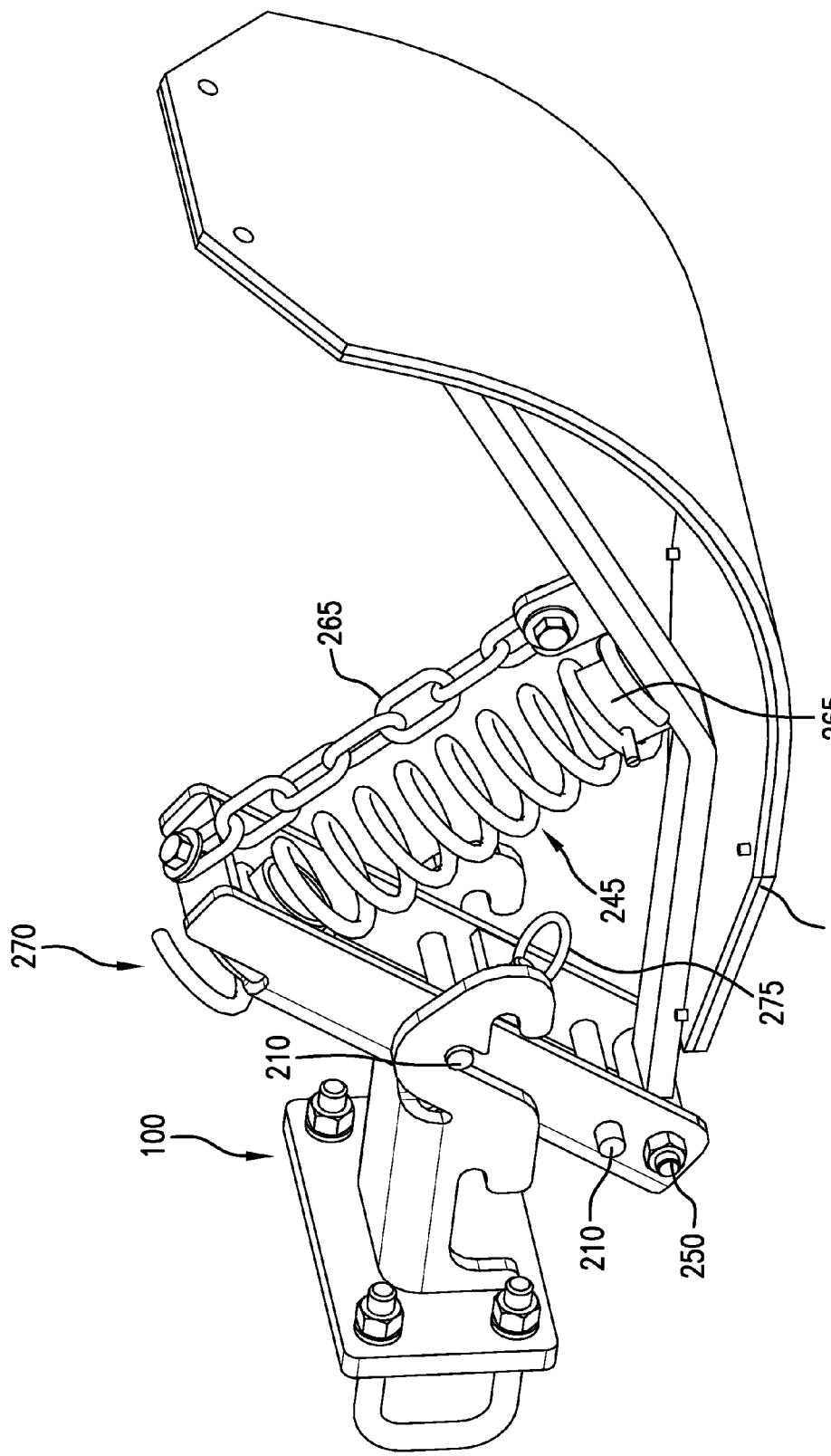
Figure 10:
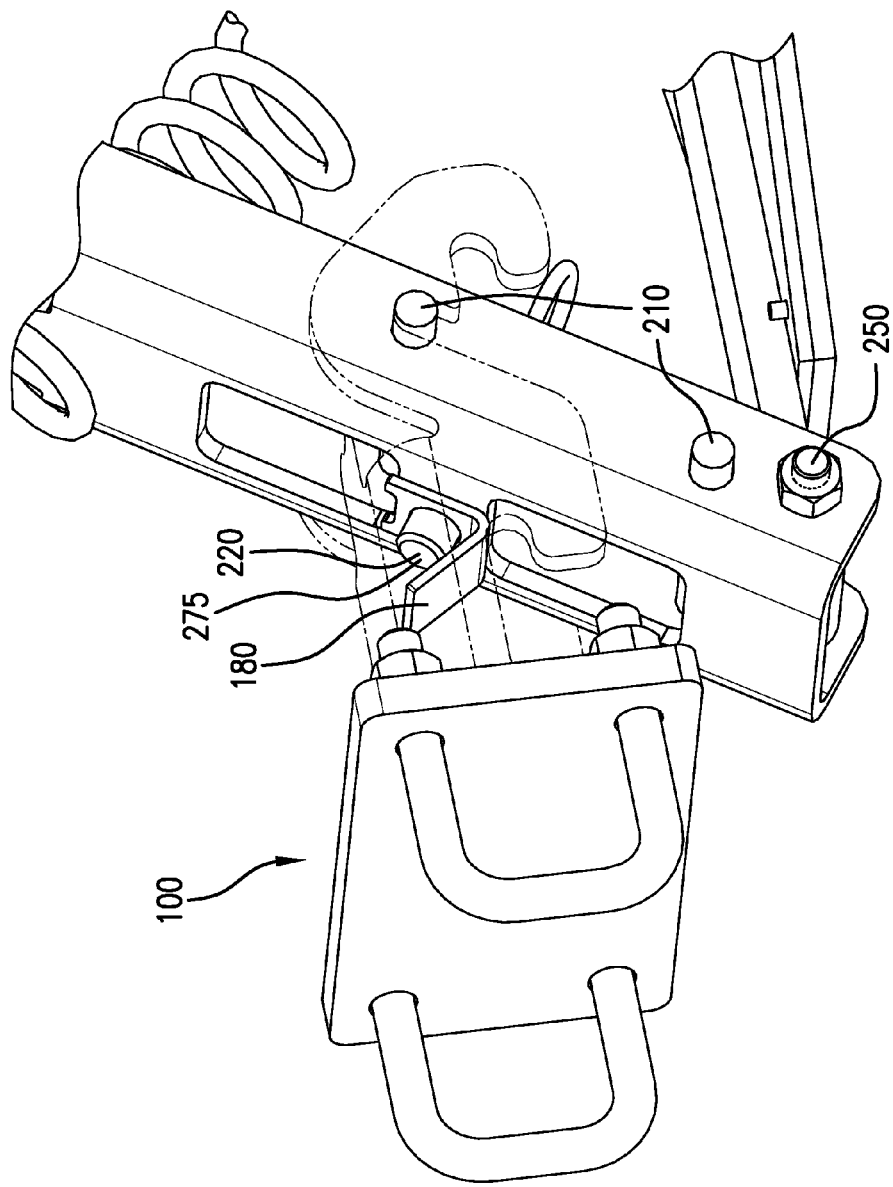

FIGS. 8-10 depict perspective views of an exemplary stalk stomper mounted in a transport position on a toolbar. Before transporting the exemplary stalk stomper 200 over a paved road, the stalk stomper 200 may be mounted in a transport orientation of the toolbar mount 100. In the FIGS. 8-10 depictions, the exemplary stalk stomper 200 is mounted at an attitude that is rotated approximately 45 degrees from that of the mounted operating attitude (See FIGS. 5-7). In the FIGS. 8-10 embodiment, one of the horizontal projections 210 is received by the transport slot 160. When the implement bar 205 is positioned such that the horizontal projection 210 is received into the transport slot 160, the securing pin 220 will be automatically forced into the transport securing hole 175 by the spring 225.

In FIGS. 3-10, the exemplary stalk stomper is depicted having an adjustable tensioning/height system. A coil spring 245 is under compression. This compressed coil spring 245 directs a force to pivot that stalk stomper 200 open about a pivot point 250. The compressive spring force encourages an angle 255 between the implement bar 205 and a shoe 260 to increase (See FIG. 9). A chain 265 limits the angle 255 between the shoe 260 and the implement bar 200. A spring adjustment member 265 is rotatable attached to the shoe 260 and rigidly attached to a base of the spring 245. When the spring adjustment member 265 is rotated, a top end 270 of the spring 245 threads over a top of the implement bar 200. In this way, the effective spring, which is the portion under compression, may be lengthened or shortened. Adjusting the length of the effective spring may provide either a different ground force or a different operating height or both, when the stalk stomper is in contact with the ground. For example, one may position mount the stalk stomper in the operating position wherein the shoe is in contact with the ground, and then adjust the force imparted by the stalk stomper to the ground. Or, for example, one may determine the force desired to be imparted and adjust the height at which that force is imparted.

In some embodiments, the coil spring 245 may be connected between an implement bracket 205 and a skid shoe 260. The coil spring 245 may couple to the implement bracket 205 via a spring end connector 270. The coil spring 245 may couple to the skid shoe 260 via an opposite end connector 265. In various embodiments an operating length of the coil spring 245 may be adjustable. For example, in some embodiments, the coil spring 245 may be treaded upon a spring end connector 270. If, for example, to reduce the operating length of the coil spring 245, a spring connector 275 is removed and the coil spring 245 is rotated upon the threads of the spring end connector 270, increasing an inoperative length of the coil spring above the implement bracket 205 and reducing the operating length of the coil spring 245 between the implement bracket 205 and the skid shoe 260. The spring connector 275 may then be used to reconnect the coil spring 245 to the opposite end connector 265. In some embodiments, a corresponding adjustment of an operating length of the chain 265 may be made.

Figure 11:
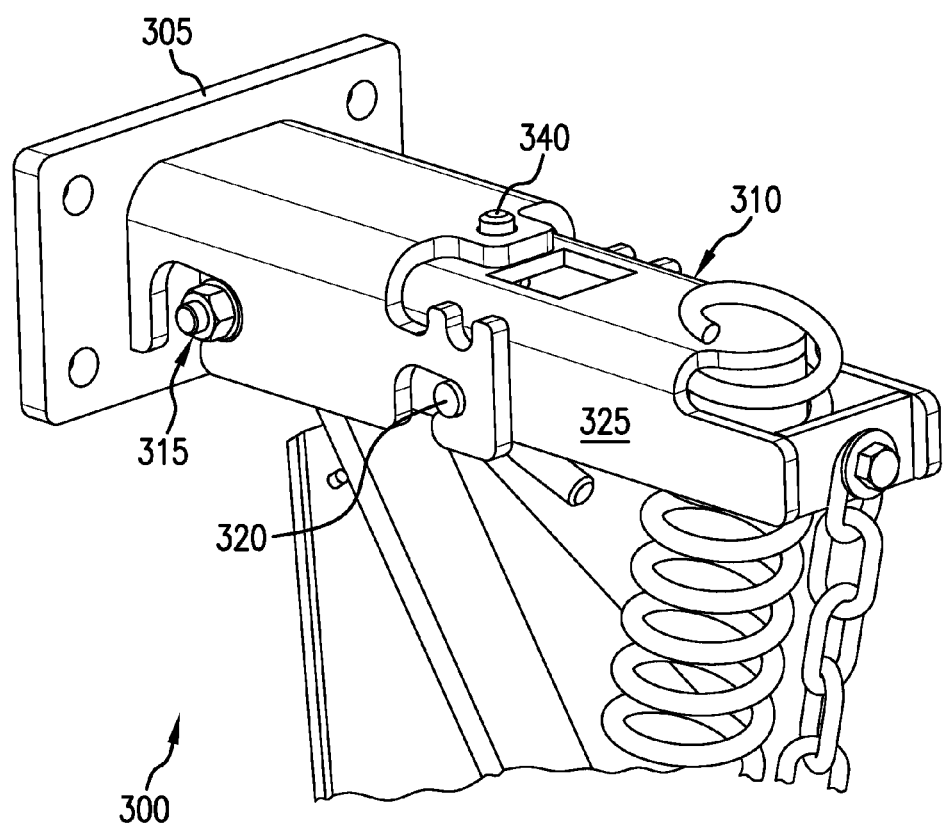
FIGS. 11-12 depict perspective views of an exemplary mounting assembly for a farm implement to a toolbar.
Figure 12:
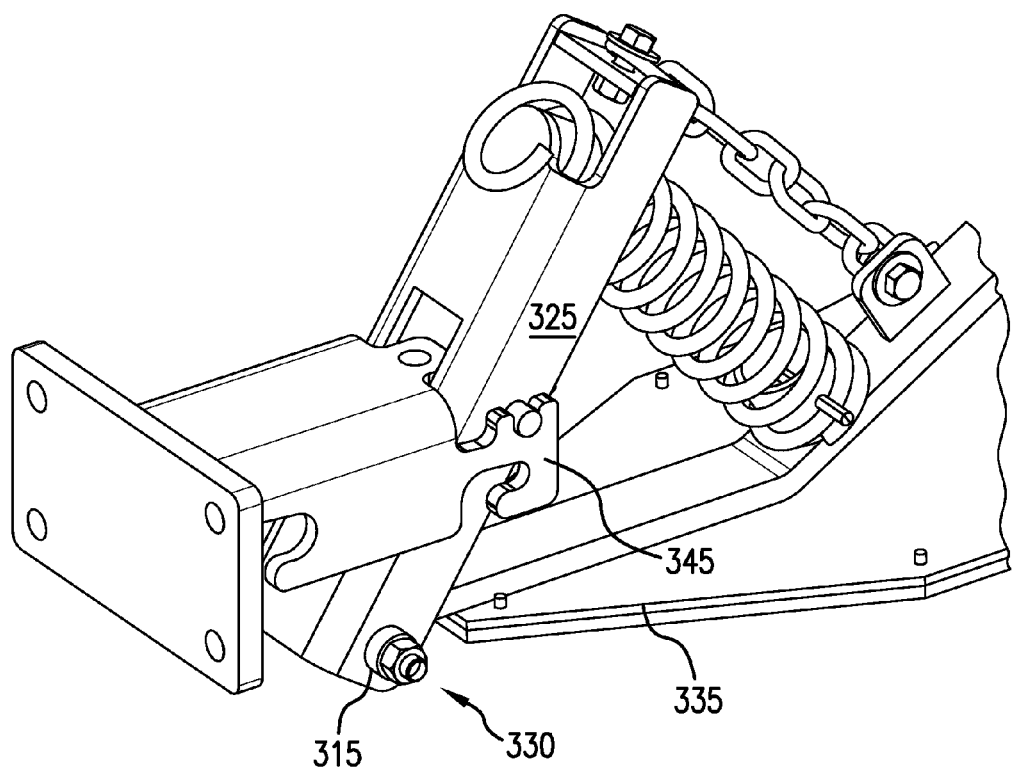

FIGS. 11-12 depict perspective views of an exemplary mounting assembly for a farm implement to a toolbar. In the FIGS. 11-12 depictions, an exemplary quick connect/disconnect dual position mounting system 300. The mounting system has both a mounting bracket 305 and an implement coupler 310. The implement coupler 310 has two horizontal pins 315, 320 projecting from lateral sides of the implement coupler. 310. A forward pin 215 has a raised shoulder from a sidewall 325 of the implement coupler 310. The forward pin 315 is coaxial with the pivoting connection between a shoe 335 and the implement coupler 310. A rear pin projection 320 is raised from the sidewall 325. Both horizontal pins 315, 320 may engage slots in the mounting bracket 305. A spring-loaded locking mechanism 340 may engage a complimentary locking feature on the mounting bracket 305 when the implement coupler 310 is received by the mounting bracket 305 and longitudinal slid into an operating position (See FIG. 11). The exemplary implement coupler may engage transport mounting features for mounting in a transport position as well (See FIG. 12). The depicted transport position permits the implement to be supported by a transport shelf 345 that engages the rear horizontal pin 320 of the implement coupler 310. The implement may be automatically locked when positioned in the transport position.

Figure 13:
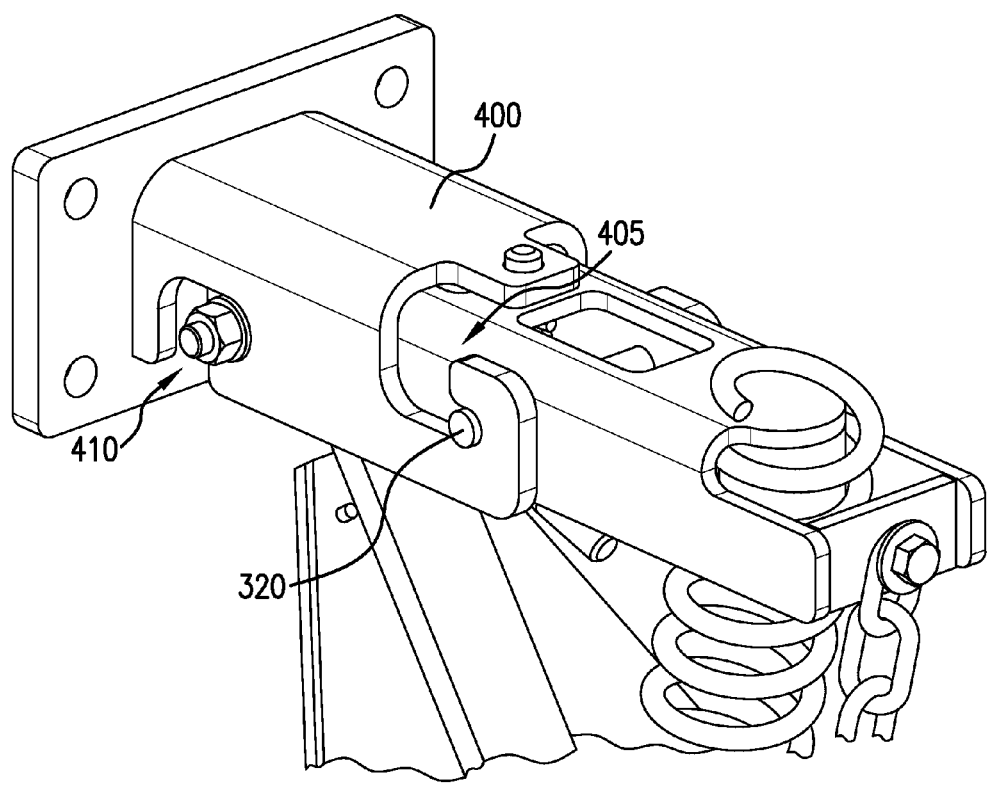
FIGS. 13-14 depict perspective views of an exemplary mounting assembly for a farm implement to a toolbar.
Figure 14:
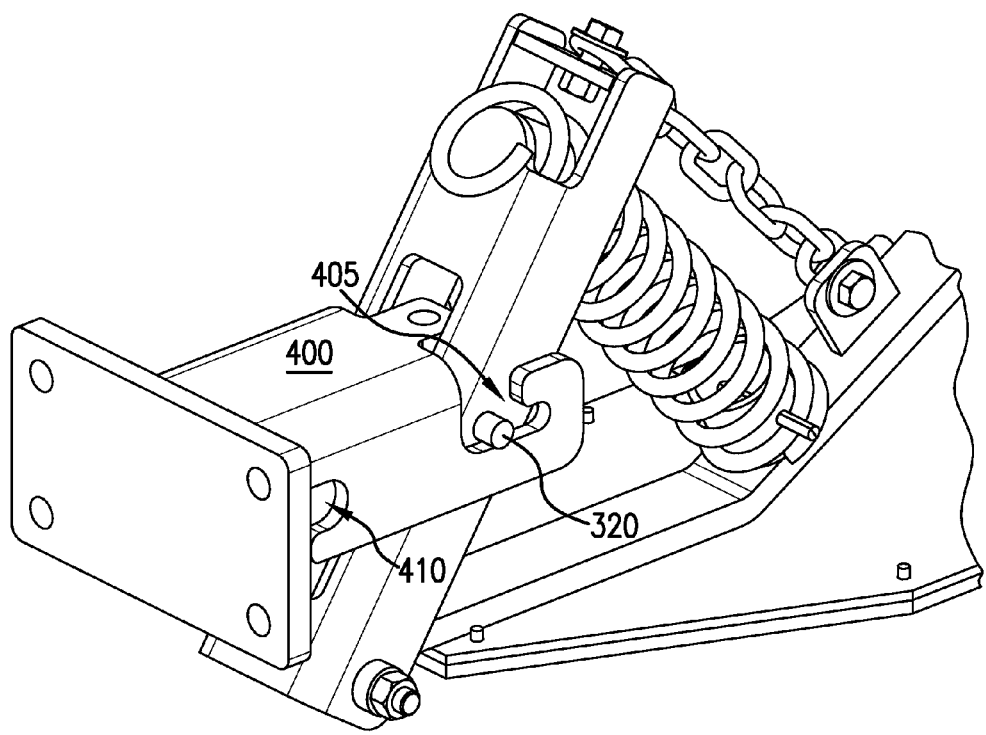

FIGS. 13-14 depict perspective views of an exemplary mounting assembly for a farm implement to a toolbar. The FIGS. 13-14 embodiments are very similar to those of FIGS. 11-12. But in the FIGS. 13-14 embodiments, a common recess is used to receive the rear horizontal pin 320 in both the transport position and in the operating position. To mount the implement using the depicted mounting bracket 400, the implement coupler 310 may be oriented at an angle so that the rear horizontal pin 320 may be received by the common recess 405. The implement coupler 310 may then be pivoted so that the front horizontal pin is received into a front recess 410. The implement coupler 310 may then be longitudinally slid until the spring-loaded securing device 215 engages a securing hole in a top of the mounting bracket 400. Similarly, the implement coupler 310 may be mounted in a transport orientation (See FIG. 14). Just as in the FIGS. 11-12 embodiments, the implement may be supported by a shelf in the common recess during transport mounting.

Figure 15:
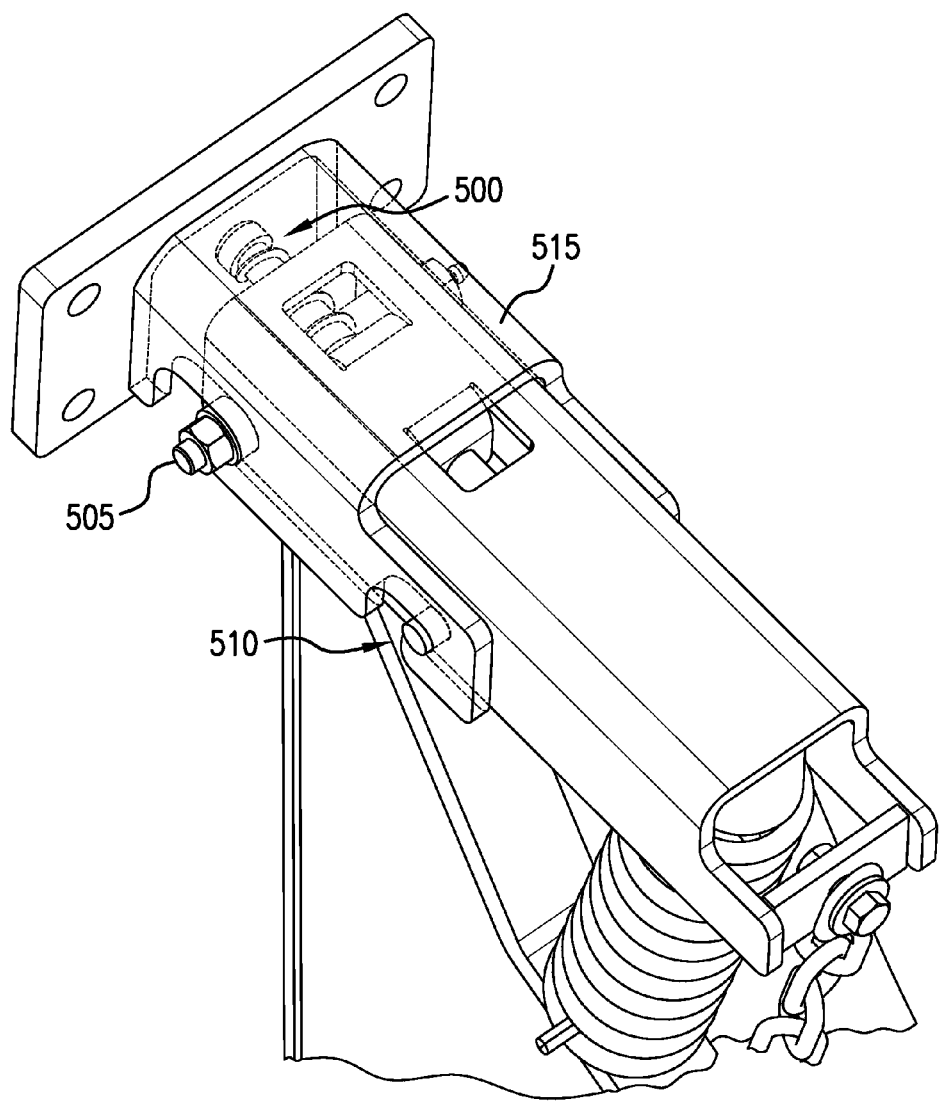
FIGS. 15-16 depict perspective views of an exemplary mounting assembly for a farm implement to a toolbar.
Figure 16:
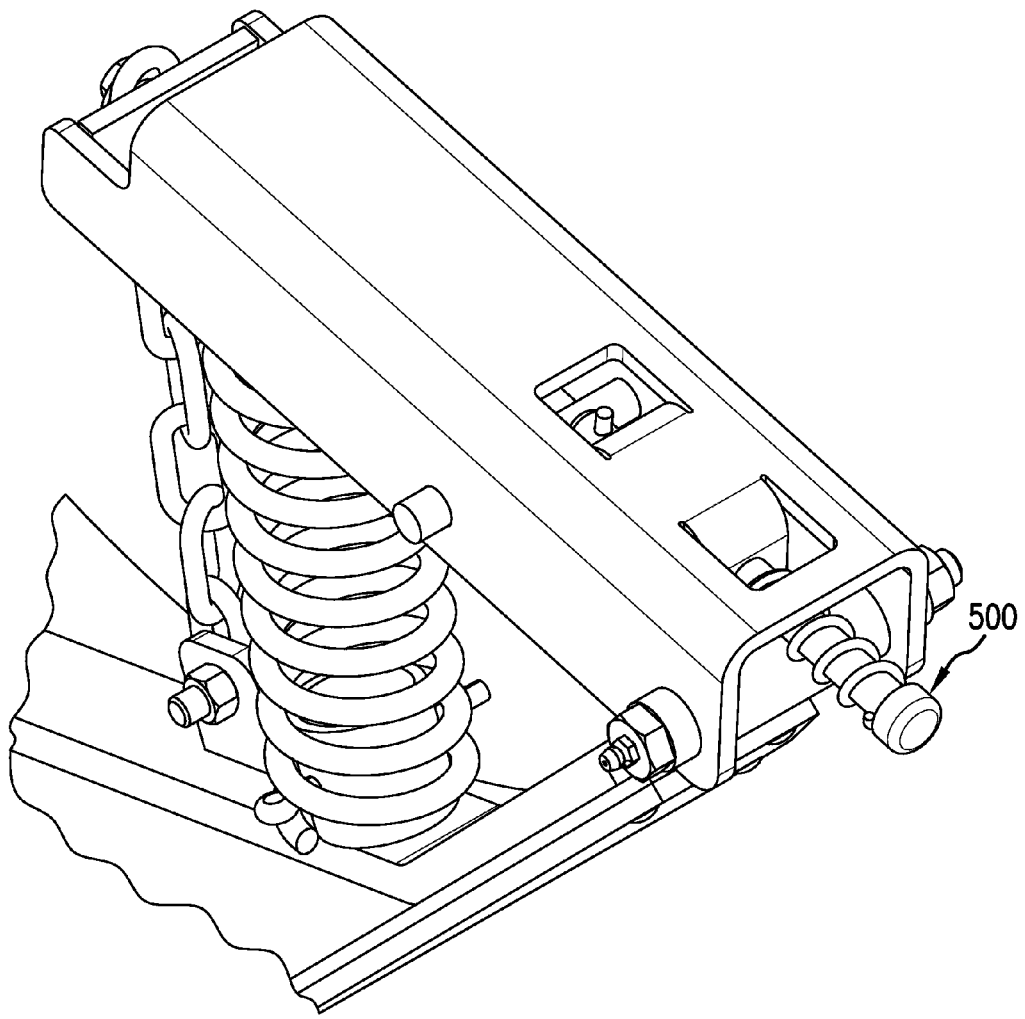

FIGS. 15-16 depict perspective views of an exemplary mounting assembly for a farm implement to a toolbar. In the FIGS. 15-16 embodiment, a spring tensioner 500 provides a force securing an implement coupler to a mounting bracket 515. The spring tensioner 500 directs a force that maintains horizontal pins 315, 320 in two engagement slots 505, 510. To remove the implement coupler from the mounting bracket 515, a user must slide the implement coupler against the retaining force provided by the spring tensioner, and then drop the implement so that the pins are extracted from the recesses.

Figure 17:
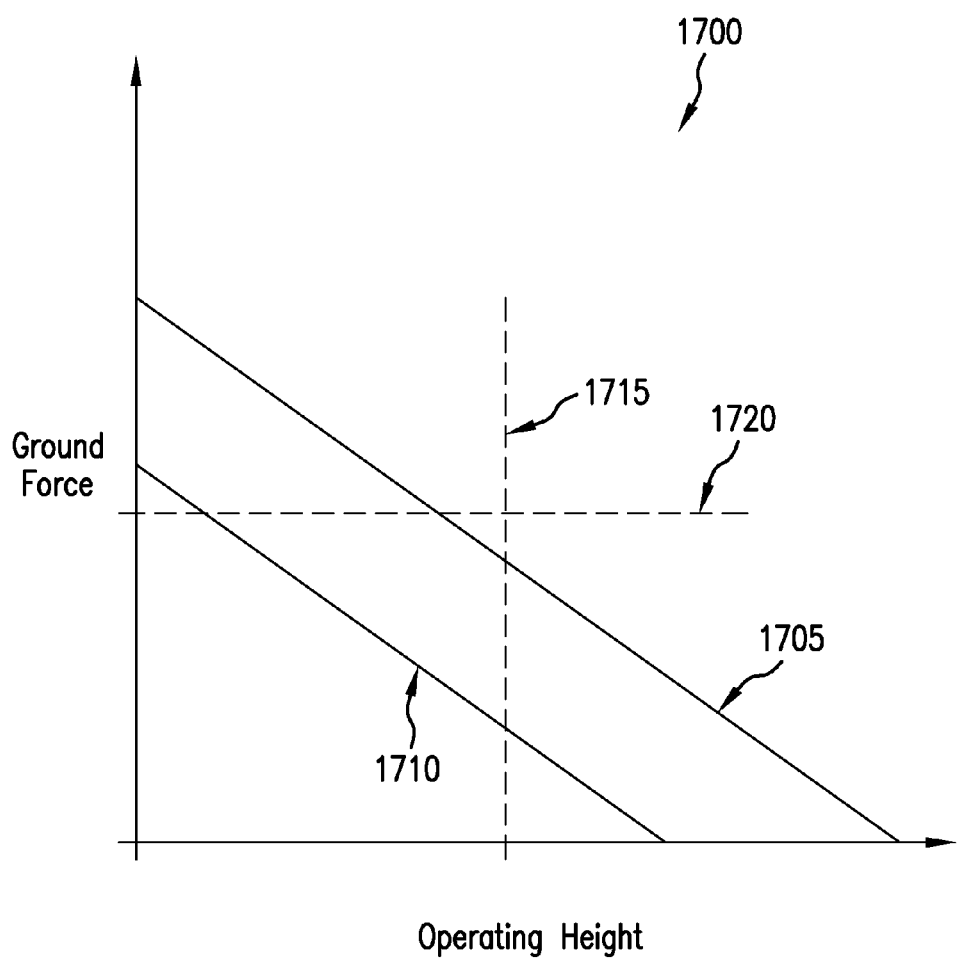
FIG. 17 depicts a graph of the ground force imparted by an exemplary stalk stomper as a function of operating height.

FIG. 17 depicts a graph of the ground force imparted by an exemplary stalk stomper as a function of operating height. Generally, when the operating height of the stalk stomper decreases, the spring 245 is further compressed, which results in a greater force being imparted to the ground. In FIG. 17, a graph 1700 shows the relationship between the ground force and the operating height for two different spring adjustment settings. When the full length of the spring is under compression, a maximum ground force relation 1705 is depicted. The spring adjustment member 265 may be used to reduce the length of the compressed portion of the spring 245. The resulting reduced ground force relation 1710 will produce a smaller force for every operating height than when the full length of the spring is under compression. For a constant operating height 1715, one can use the spring adjustment member 265 to change the nominal ground force imparted by the stalk stomper 200. Or, for a constant operating height 1720, the spring adjustment member 265 may be used to change the operating height of the stalk stomper 200.

Figure 18:
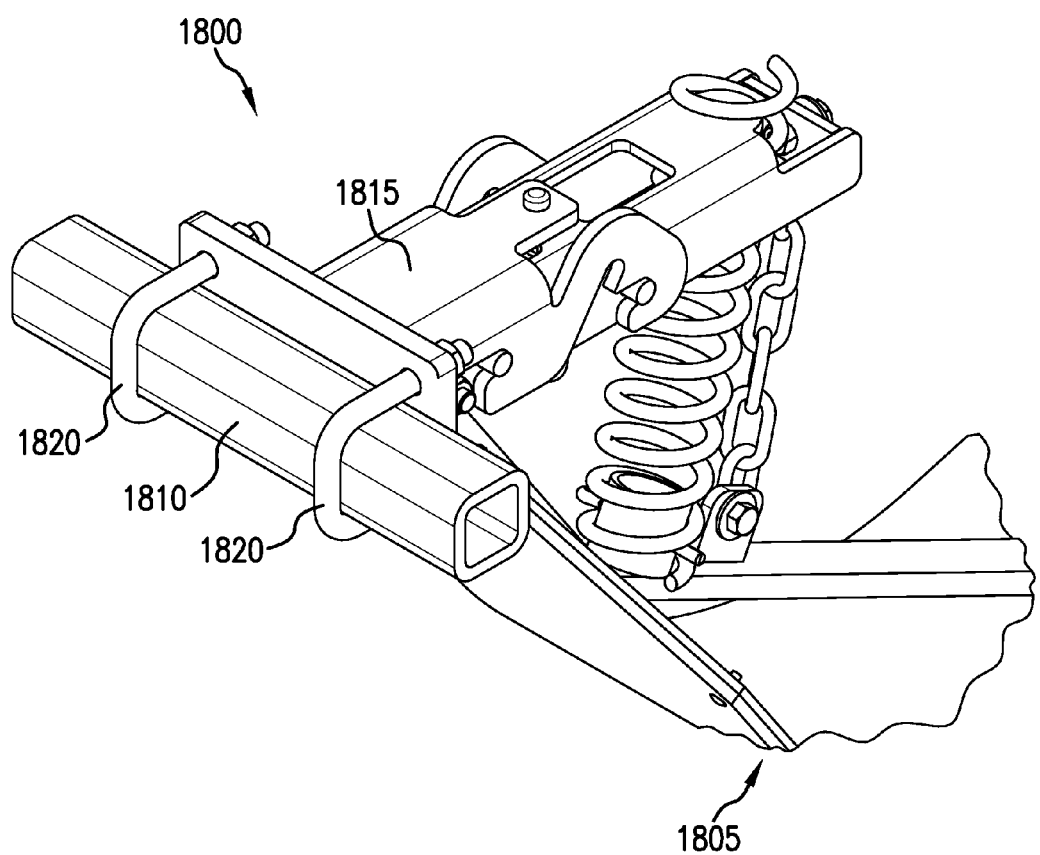
FIGS. 18-19 depict perspective views of an exemplary stalk stomper mounted to a toolbar via an exemplary quick connect/disconnect coupler.
Figure 19:
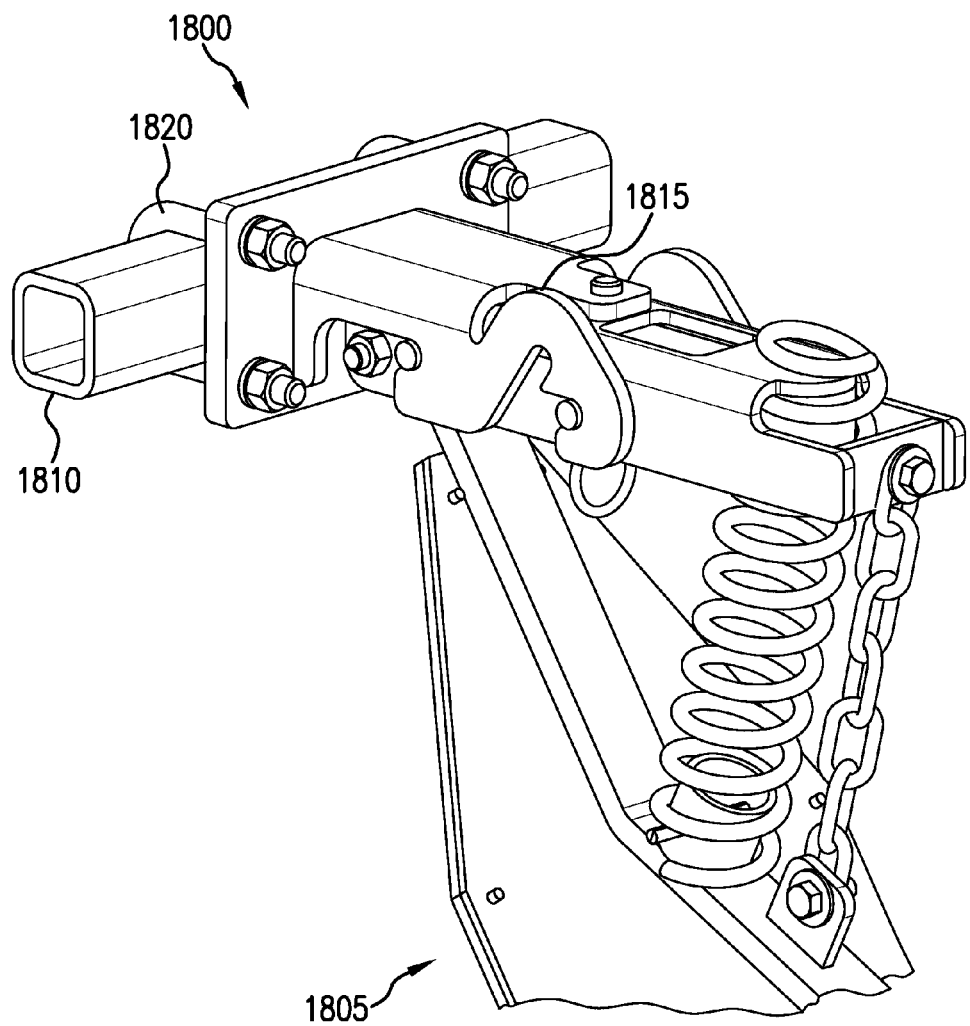

FIGS. 18-19 depict perspective views of an exemplary stalk stomper mounted to a toolbar via an exemplary quick connect/disconnect coupler. In the FIGS. 18-19 depictions, a mounted assembly 1800 includes a stalk stomper 1805 coupled to a toolbar 1810 via a quick connect/disconnect coupler 1815. The quick connect/disconnect coupler is attached to the toolbar via a pair of U-bolts 1820.

Figure 20:
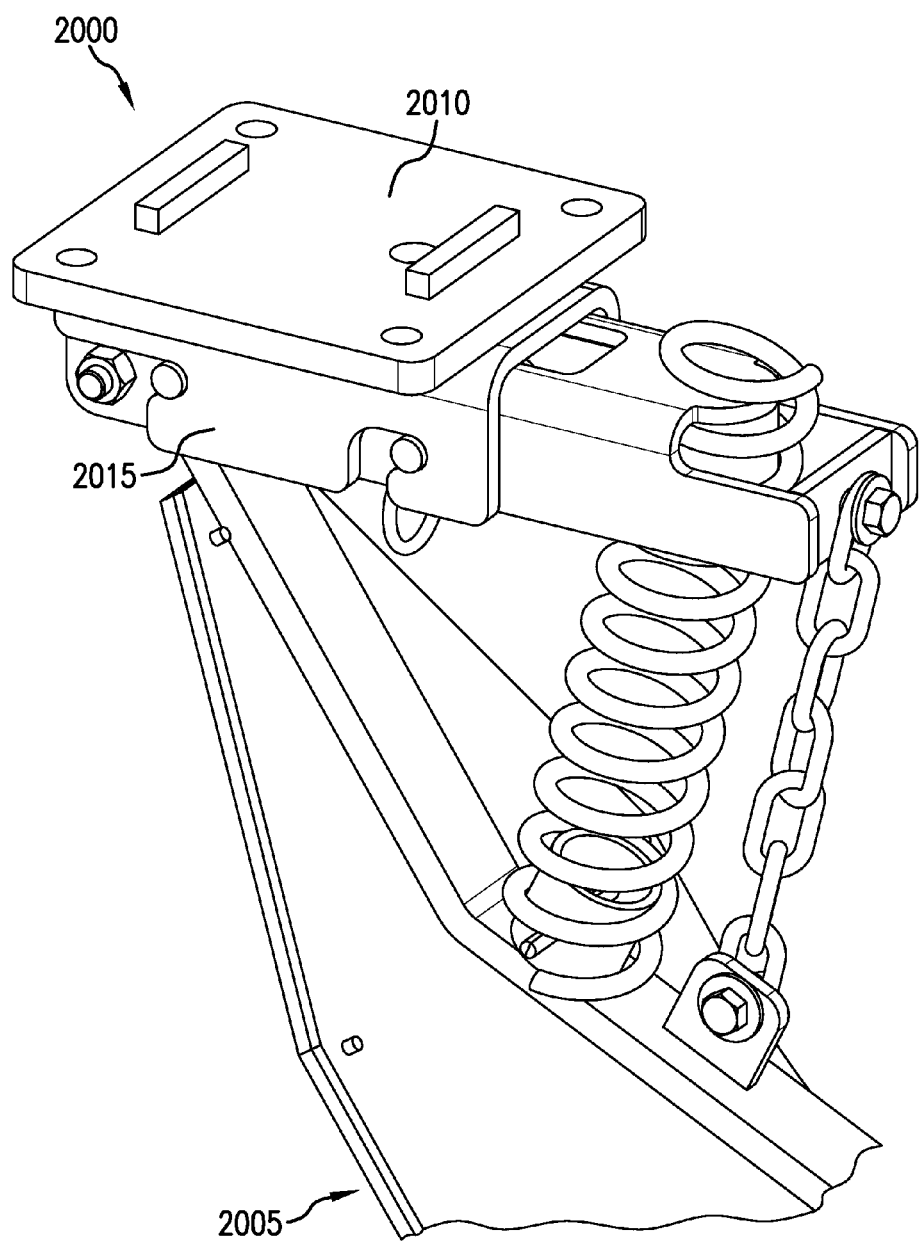
FIGS. 20-22 depict perspective views of an exemplary row unit mounting assembly for a farm implement.
Figure 21:
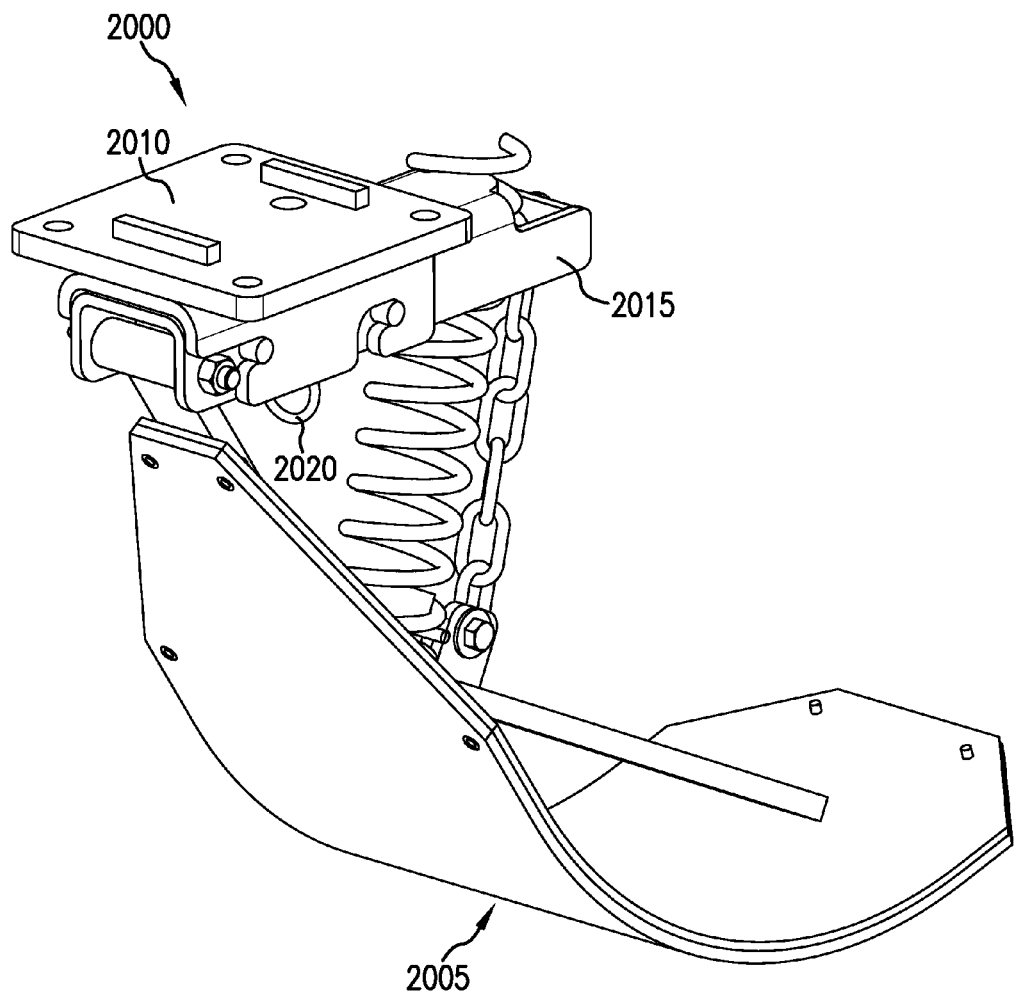
Figure 22:
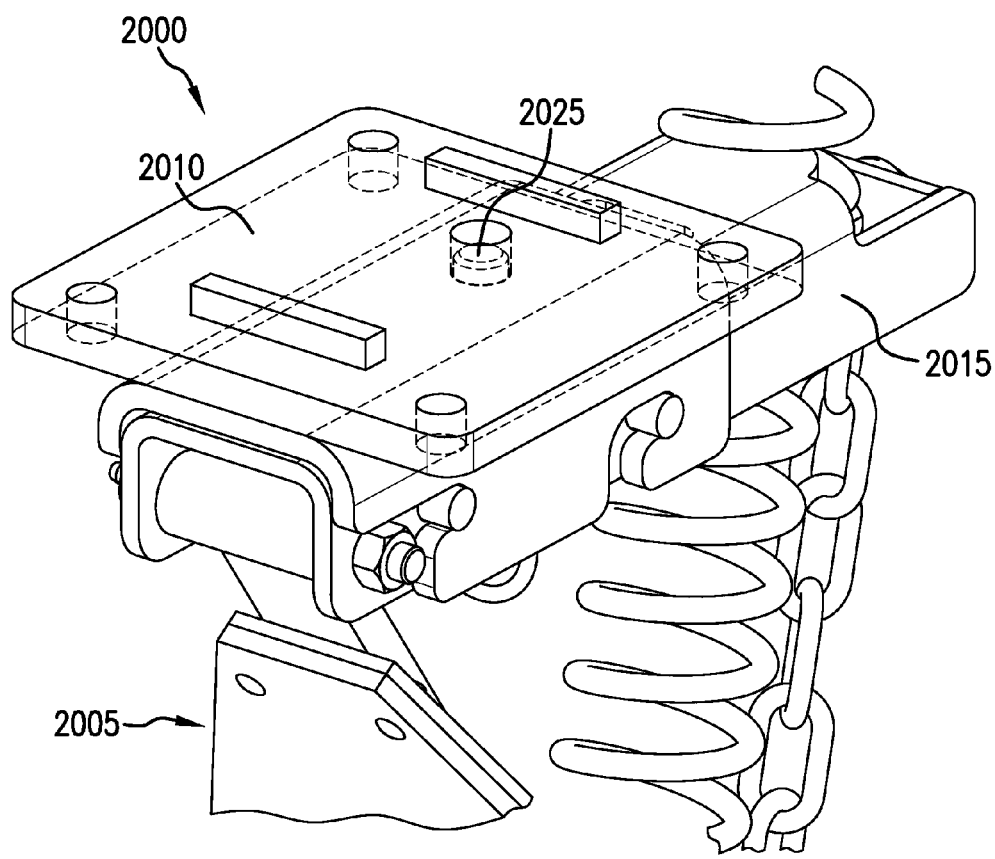

FIGS. 20-22 depict perspective views of an exemplary row unit mounting assembly for a farm implement. In the FIGS. 20-22 embodiments, a mounted assembly 2000 includes a stalk stomper 2005 coupled to a row unit mounting bracket 2010 via a quick connect/disconnect coupler 2015. In the depicted embodiment, the stalk stomper is locked in place using a spring-loaded locking member 2020. A projecting tip 2025 of the spring-loaded locking member is received in a hole in the mounting bracket 2010.

Although various embodiments have been described with reference to the Figures, other embodiments are possible. For example, an exemplary two-translation mounting assembly for mounting a farm implement to a toolbar may include a toolbar bracket configured to be mounted on a toolbar. In some examples, the substantially-planar top plate may have a securing member. In some embodiments, the toolbar bracket may have two substantially-parallel sidewalls each depending from opposite lateral ends of a substantially-planar top plate. In an illustrative embodiment, the depending sidewalls may have laterally-aligned and longitudinally-oriented slots. In some embodiments, the depending sidewalls and the top plate may define a cavity that is downward-opening toward a ground surface when the toolbar bracket is mounted on the toolbar.

Some embodiments may have an implement connector configured to be coupled to a farm implement. Various implement connectors may include an implement bracket. Some implement connectors may have a pair of projections extending laterally outward from the implement bracket to simultaneously engage the slot of each of the depending sidewalls when the implement connector is operatively coupled to the toolbar bracket. Some exemplary implement connectors may have a spring-biased locking member integrally coupled to the implement connector and arranged for releasable engagement with the securing member the top plate, for example. In some embodiments, the implement connector may releasably mount to the toolbar bracket in an operational configuration upon two sequential translations. In an exemplary embodiment, a first translation may involve the implement connector being upwardly raised so that a portion of the coupling bracket is received into the downward-opening cavity of the toolbar bracket. In some embodiments, a second translation may involve the implement connector being longitudinally translated so that the pair of projections are received into the slots of the depending sidewalls, and the spring-biased locking member may automatically engage the securing member of the top plate.

Various embodiments may include means for automatically securing the implement connector to the toolbar bracket when the implement connector in the operational position. For example, some embodiments may provide a spring-biased pin as part of one of the implement connector and the toolbar bracket. The spring-biased pin may align with a securing aperture of the other of the implement connector and the toolbar bracket, when the implement connector is positioned in a connecting position with respect to the toolbar bracket. In some embodiments, the automatic securing means may include one or more of various spring-biased members. For example a spring-biased lever may be used to automatically secure an implement connector to a toolbar bracket. In some embodiments a magnetic securing mechanism may be used to automatically connect an implement connector to a toolbar bracket, for example.

Various embodiments may have various means for securing the implement bracket to the toolbar bracket. For example, some embodiments may secure the implement bracket to the toolbar bracket by pin insertion into an aperture. Some embodiments, for example, may have a spring-biased lever on one bracket member that engages a surface on a complementary bracket member. In an exemplary embodiment, the pin may be spring-biased. In some embodiments, a spring-biased locking member may be operatively coupled to the implement bracket. In some embodiments, a spring-biased locking member may be operatively coupled to the toolbar bracket.

In some embodiments lateral projections may extend from opposing sides of a bracket member. A complementary bracket member may have recesses in sidewalls configured to receive the lateral projections. In an exemplary embodiment, a crossbar may extend between depending sidewalls of a bracket member. A complementary bracket member may have sidewalls that are inset from the sidewalls of the bracket member, for example. The sidewalls of the complementary bracket may have recesses configured to receive the crossbar, for example. In some embodiments, a bracket may have recesses in the form of an L-shape. The L-shaped recesses may receive lateral projections in two translation directions. For example, the lateral projections may first be received into a first segment of the L-shaped recess. Then, for example, the lateral projection may be translated into a second segment of the L-shaped recess.

In some embodiments a bracket may have a top plate and depending sidewalls from opposing lateral sides of the top plate. In some embodiments, the depending sidewalls and the top plate may together define a cavity. The cavity may be defined by a U-shaped cross-sectional profile, for example. A complementary bracket may be configured to be received into the cavity. In some embodiments, the complementary bracket may have a U-shaped cross-section profile. The dimensions of the U-shaped cross-sectional profile of the complementary bracket may be slightly smaller than those of the U-shaped cross-sectional profile that defines the cavity. In some embodiments, the complementary bracket may have a substantially-square cross-sectional profile. In an exemplary embodiment, the complementary bracket may have a plate-like cross-sectional profile.

A number of implementations have been described. Nevertheless, it will be understood that various modification may be made. For example, advantageous results may be achieved if the steps of the disclosed techniques were performed in a different sequence, or if components of the disclosed systems were combined in a different manner, or if the components were supplemented with other components. Accordingly, other implementations are contemplated.

What is claimed is:

1. A two-translation mounting assembly for mounting a farm implement to a toolbar, the mounting assembly comprising:
   a toolbar bracket configured to be mounted on a toolbar, the toolbar bracket having a securing member and two parallel sidewalls each depending from opposite lateral ends of a planar top plate, the depending sidewalls having laterally-aligned and longitudinally-oriented slots, wherein the depending sidewalls and the top plate define a cavity that is downward-opening toward a ground surface when the toolbar bracket is mounted on the toolbar; and,
   an implement connector configured to be coupled to a farm implement, the implement connector comprising:
   an implement bracket;
   a pair of projections extending laterally outward from the implement bracket to simultaneously engage the slot of each of the depending sidewalls when the implement connector is operatively coupled to the toolbar bracket; and,
   a spring-biased locking member integrally coupled to the implement connector and arranged for releasable engagement with the securing member, wherein the implement connector releasably mounts to the toolbar bracket in an operational configuration upon sequential translations, the sequential translations comprising:
   i) first, the implement connector is upwardly raised so that a portion of a coupling bracket is received into the downward-opening cavity of the toolbar bracket; and,
   ii) second, the implement connector is longitudinally translated so that the pair of projections are received into the slots of the depending sidewalls, and the spring-biased locking member automatically engages the securing member; and
   wherein the securing member is a first securing member and the toolbar bracket has a second securing member, wherein the slots of the depending sidewalls are first slots, and the depending sidewalls further have second laterally-aligned slots, and, wherein the implement connector releasably mounts to the toolbar bracket in a transport configuration by translating the implement connector so that the pair of projections is received into the second laterally-aligned slots of the depending sidewalls, and the spring-biased locking member engages the second securing member of the tool bar bracket.

2. The two-translation mounting assembly of claim 1, wherein, when the spring-biased locking member engages the securing member, the lateral projections are prevented from longitudinally sliding out of the slots of the depending sidewalls.

3. The two-translation mounting assembly of claim 1, wherein the slots of the depending sidewalls are first slots, and the depending sidewalls further have second laterally-aligned and longitudinally-oriented slots spaced longitudinally from the first slots, and the pair of projections of the implement connector is a first pair of projections, and the implement connector further has a second pair of projections extending laterally outward from the implement bracket and spaced longitudinally from the first pair of projections.

4. The two-translation mounting assembly of claim 3, wherein each of the first pair of projections has an axis that is parallel to an axis of each of the second pair of projections.

5. The two-translation mounting assembly of claim 1, wherein the laterally aligned and longitudinally-oriented slots are forward opening, wherein the opening faces a direction of implement travel when mounted to the toolbar.

6. The two-translation mounting assembly of claim 1, further comprising a farm implement.

7. The two-translation mounting assembly of claim 6, wherein the farm implement is a stalk stomper.

8. The two-translation mounting assembly of claim 1, wherein a lateral distance between exterior lateral surfaces of the implement connector is less than a lateral distance between interior lateral surfaces of the depending sidewalls of the toolbar bracket.

9. The two-translation mounting assembly of claim 1, wherein the implement bracket has a U-shaped profile when cross-sectioned by a plane perpendicular to a longitudinal dimension of the implement bracket.

10. The two-translation mounting assembly of claim 1, wherein, when the implement connector is upwardly raised so that the portion of the implement bracket is received into the downward-opening cavity of toolbar bracket, the spring-biased locking member engages a bottom surface of the top plate and is forced against the spring bias.

11. The two-translation mounting assembly of claim 1, wherein, when the implement connector is longitudinally translated so that the pair of projections are received into the laterally-aligned and longitudinally oriented slots to a securing position, the spring-biased locking member automatically engages the securing member of the tool bar bracket.

* * * * *